United States Patent
Bravo et al.

[19]

[11] Patent Number: 5,803,644
[45] Date of Patent: Sep. 8, 1998

[54] REINFORCED FASTENING CONNECTION

[75] Inventors: Ernesto Bravo, Cambiano, Italy; Peter Höbel, Neuhausen, Germany

[73] Assignee: Dr. Ing. h.c.F. Porsche AG, Weissach, Germany

[21] Appl. No.: 829,290

[22] Filed: Mar. 31, 1997

[30] Foreign Application Priority Data

Mar. 29, 1996 [IT] Italy ................................ TO96A0246

[51] Int. Cl.[6] ....................................................... F16B 9/00
[52] U.S. Cl. ........................ 403/185; 403/179; 403/193; 403/274; 403/368; 411/180
[58] Field of Search .................. 403/365, 367, 403/368, 274, 279, 280, 282, 179, 193, 185; 24/113, 703.1, 902, 90.1, 114.3; 411/180, 181, 338, 339

[56] References Cited

U.S. PATENT DOCUMENTS

| | | | |
|---|---|---|---|
| 2,495,103 | 1/1950 | Huppert | 403/282 X |
| 3,973,296 | 8/1976 | Peterson | 24/113 X |
| 4,410,295 | 10/1983 | Ersoy et al. | 403/122 |
| 4,736,865 | 4/1988 | Rericha | 220/307 |
| 4,836,705 | 6/1989 | LaBarge et al. | 403/282 |
| 4,858,281 | 8/1989 | Watanabe et al. | 24/113 X |
| 4,943,197 | 7/1990 | Baritz | 24/113 X |
| 5,093,965 | 3/1992 | Mauras et al. | 24/113 X |
| 5,251,370 | 10/1993 | Muller et al. | 29/512 |
| 5,613,794 | 3/1997 | Isaac et al. | 403/179 X |

FOREIGN PATENT DOCUMENTS

| | | |
|---|---|---|
| 0451478A1 | 10/1991 | European Pat. Off. . |
| 2225825A | 6/1990 | United Kingdom . |

*Primary Examiner*—Daniel P. Stodola
*Assistant Examiner*—Bruce A. Lev
*Attorney, Agent, or Firm*—Evenson McKeown Edwards & Kenahan, PLLC

[57] ABSTRACT

A reinforced fastening point for a plastics-material casing. In order to provide a reinforcement for a fastening point which is simple to assemble and which is held automatically in the opening in the casing without further fasteners, a cylindrical opening is provided at the fastening point on the casing. The reinforcement part corresponding thereto is constructed as a frustum in that region which in the assembled state comes to rest in the region of the cylindrical opening. The smaller external diameter of this frustum is smaller than or equal to the internal diameter of the cylindrical opening. The larger external diameter of the frustum, on the other hand, has an excess dimension with respect to the internal diameter of the cylindrical opening. In this case, the excess dimension is selected to be such that it can be neutralized by resilient deformation of the reinforcement part.

8 Claims, 1 Drawing Sheet

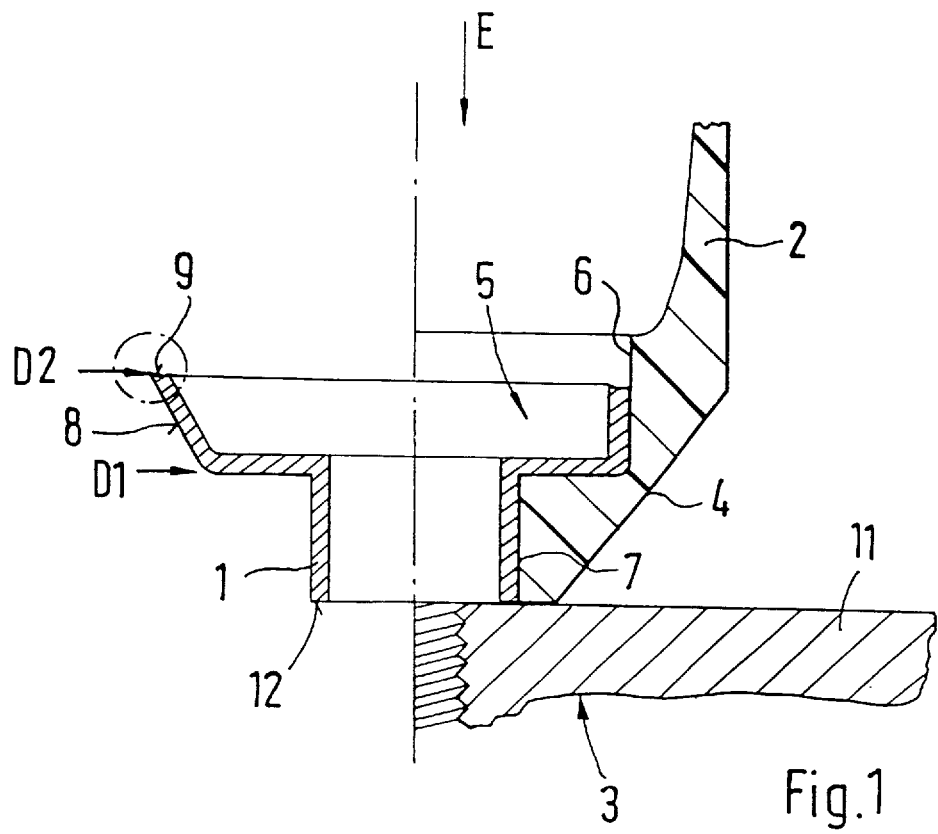
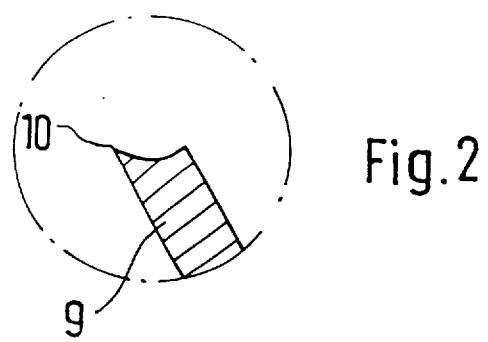

REINFORCED FASTENING CONNECTION

BACKGROUND AND SUMMARY OF THE INVENTION

This application claims the priority of Italian application TO 96 A 000246 filed Mar. 29, 1996 in Italy, the disclosure of which is expressly incorporated by reference herein.

The invention relates to a reinforced fastening point for a plastics-material casing.

In the case of plastics-material casings the problem arises of designing the fastening points in such a way that the forces which occur here are reliably introduced into the plastics-material casing. In particular, it is necessary to prevent the plastics-material casing from tearing or the like in the region of the fastening points.

In this connection it is generally known to design the fastening point in such a way that it is possible to use a fastening member with the introduction of force over a wide area, for example a screw with a washer. This solution, however, can only be used where reinforcement is required exclusively in the direction of the fastening force, but not at right angles thereto.

Furthermore, it is generally known to reinforce fastening points on plastics-material casings in such a way that a reinforcement part adapted to the contour of the aperture in the casing is used in the region of the fastening point. It is also possible to absorb forces at right angles to the fastening direction by means of a reinforcement part of this type. In addition, it is possible to design the reinforcement part in such a way that the fastening forces too are partially absorbed by the reinforcement part, so that the fastening forces acting upon the plastics-material casing are restricted to a maximum and so damage to the plastics-material casing by excessive fastening forces is prevented in a reliable manner.

Reinforcement parts of this type require additional steps during assembly. If the reinforcement part has to be fitted in the course of assembly, as well as the additional assembly step, it is additionally necessary to supply the reinforcement parts. If the reinforcement parts are to be pre-assembled in the plastics-material casing, additional fastening devices are necessary for the reinforcement parts.

An object of the invention is to provide a reinforcement for a fastening point which is simple to assemble and which is held automatically in the opening in the casing without further fastening means.

To this end, it is proposed according to the invention to provide a cylindrical opening at the fastening point on the casing. The reinforcement part corresponding thereto is constructed as a frustum in that region which in the assembled state comes to rest in the region of the cylindrical opening. The smaller external diameter of this frustum is smaller than or equal to the internal diameter of the cylindrical opening. The larger external diameter of the frustum, on the other hand, has an excess dimension with respect to the internal diameter of the cylindrical opening. In this case, the excess dimension is selected to be such that it can be neutralized by resilient deformation of the reinforcement part. The reinforcement part is now advantageously held in the cylindrical opening by the forces which occur during the resilient deformation. In this case, it should be noted in particular that the reinforcement part need not be put in its final position during pre-assembly, but has only to be inserted so far that it is held in such a way as to prevent its loss. The final position is then set automatically during assembly by tightening the fastening member.

According to advantageous features of preferred embodiments, it is proposed to increase the force by which the reinforcement part is held in the cylindrical opening by providing a burr on the outside of the sheet-metal edge present at the largest diameter of the frustum. When the reinforcement part moves contrary to the direction of insertion this burr digs into the plastics-material casing and thus holds the reinforcement part securely in the cylindrical opening.

A burr of this type can be produced in a particularly simple manner in that the reinforcement part is produced by deep drawing a stamped sheet-metal disc. The burrs necessarily occurring in this manufacturing process can thus be utilized in a profitable manner. The burr can be formed in such a way by a suitable choice of parameters during the manufacturing process (for example of the cutting gap during the stamping) that it achieves the greatest possible effect.

Other objects, advantages and novel features of the present invention will become apparent from the following detailed description of the invention when considered in conjunction with the accompanying drawings.

BRIEF DESCRIPTION OF THE DRAWINGS

FIG. 1 is a sectional view which shows a fastening connection of a plastics-material casing with a reinforcement inlay constructed according to a preferred embodiment of the invention; and FIG. 2 shows the detail X of FIG. 1.

DETAILED DESCRIPTION OF THE DRAWINGS

FIG. 1 shows a sheet-metal inlay 1 used as a reinforcement part, the sheet-metal inlay 1 being shown in the non-assembled, i.e. relaxed, state in the left-hand half of FIG. 1 and in the assembled, i.e. pre-stressed, state in the right-hand half of FIG. 1. A plastics-material casing 2 illustrated in the right-hand half of FIG. 1 has a fastening point 3 or connection which is formed as a cone 4 on the outside and as a stepped cylinder 5 on the inside. The upper step of the cylinder 5 is formed as a cylindrical opening 6, the diameter of which is larger than the diameter of a second cylindrical opening 7 adjoining it. The second cylindrical opening 7 is used for the passage of a fastening member such as a screw or bolt (not shown).

The lower region of the sheet-metal inlay 1 has an outer contour corresponding to the cylindrical opening 7. In the upper region, on the other hand, it is formed as a frustum 8, as indicated in the left-hand half of FIG. 1. The frustum 8 opens out towards the top, i.e. the lower end as viewed in a direction of insertion E corresponds in the external diameter D1 thereof to the internal diameter of the cylindrical opening 6, whereas the upper diameter is larger. As a result, at the upper diameter D2, an excess dimension is formed as compared with the cylindrical opening 6, in the fitted state, i.e. when the frustum 8 is inserted into the cylindrical opening 6, the excess dimension is neutralized by resilient deformation of the sheet-metal inlay 1 in the region of the frustum 8. This resilient deformation results in a restoring force of the sheet-metal inlay 1 radially to the cylindrical opening 6, so that the upper edge of the sheet-metal inlay 1 in the region of the larger diameter D2 is pressed against the inner wall of the cylindrical opening 6.

As shown in greater detail in FIG. 2, the upper edge 9 is provided on the outside with a burr 10. This burr 10 is pressed by the restoring force against the inner wall of the cylindrical opening 6 and as a result digs into the cylindrical opening 6, when the reinforcement inlay I is moved contrary to the direction of insertion E. In this way, as soon as the sheet-metal inlay I is inserted so far into the opening 4 that the upper edge 9 rests against the inner wall of the cylindrical opening 6, the sheet-metal inlay I can no longer be removed.

In order to pre-assemble the sheet-metal inlay I in the plastics-material casing 2 in such a way as to prevent its loss, it is sufficient to insert the sheet-metal inlay until the upper edge 9 of the sheet-metal inlay I penetrates into the cylindrical opening 6. During the subsequent assembly, for example when tightening a screw, the sheet-metal inlay I is then pulled further into the cylindrical opening 6, until it finally comes to rest against the base thereof. In addition, it is provided in the preferred embodiments that the axial length of the lower part of the sheet-metal inlay I is slightly smaller than the corresponding extension of the second cylindrical opening 7. This structural step ensures that the casing 2 comes to rest with pre-stressing against a surface 11, but this pre-stressing force cannot reach any impermissibly high figures since, as the fastening force is increased, the casing 2 in the region of the fastening point 3 can only be upset until the lower edge 12 of the sheet-metal inlay 1 comes to rest against the surface 11. When the fastening force is further increased, the additional force component on the fastening force is introduced into the surface 11 directly from the sheet-metal inlay 1.

The burr 10 illustrated is produced by a sheet-metal disc first being stamped out of a sheet-metal panel during the production of the sheet-metal inlay 1. Depending upon the tool parameters during the stamping, and in particular the width of the gap in the stamping tool, a burr is formed on an outer edge of the sheet-metal disc. The outer edge of the sheet-metal disc will subsequently correspond to the upper edge 9 of the sheet-metal inlay 1. During the further production process, the lower region 7 of the sheet-metal inlay 1 is then drawn out of the sheet-metal disc by deep-drawing. Finally, the frustum 8 of the sheet-metal inlay 1 is produced, likewise by deep-drawing. During the further deep drawing, care should be taken that the sheet-metal disc is inserted into the deep-drawing tool in such a way that the burr 10 produced will subsequently be located on the outside. The burr 10 is further reinforced by the tensile forces acting on the outer periphery of the frustum 8.

Alternatively, embodiments are contemplated wherein the sheet-metal inlay 1 is designed in such a way that the external diameter of the frustum 8 at the lower end thereof as viewed in a direction of insertion E is smaller than the internal diameter of the cylindrical opening 6. The construction of the lower region of the sheet-metal inlay 1 can thus be modified according to preferred embodiments of the invention without adversely affecting the functioning. Accordingly, this region of the lower end of the sheet-metal inlay 1 can to be omitted anywhere at the fastening point 3 where it is not necessary to limit the fastening force or where stresses are not to be expected at right angles to the direction of insertion E, which corresponds to the direction of the fastening force.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fastener assembly comprising:

a reinforcement part with an axially extending through opening for accommodating an axially extending fastener and which, in an unstressed condition, includes a conical frustum section at one axial end thereof which widens in a direction toward said one axial end, and a casing with an axially extending through opening for accommodating said reinforcement part and the insertable fastener, said through opening being dimensioned with a section having a diameter smaller than an unstressed condition diameter of said conical frustum section such that axial insertion of the reinforcement part deforms said conical frustum section to fix the reinforcement part in said through opening of the casing.

2. A fastener assembly according to claim 1, wherein the reinforcement part is a sheet metal part, and wherein an outside sheet-metal edge present at a largest diameter of the frustum is provided with a burr.

3. A fastener assembly according to claim 1, wherein the reinforcement part is produced as a sheet-metal part by stamping and subsequent deep drawing.

4. A fastener assembly according to claim 3, wherein during production of the reinforcement part, a sheet-metal disc produced by stamping is inserted into a deep-drawing tool in such a way that a burr present on the sheet-metal edge of the disc will subsequently come to be on an outside circumference at the largest external diameter of the frustum.

5. A fastener assembly according to claim 4, wherein said casing is made of plastic.

6. A fastener assembly according to claim 1, wherein said reinforcement part is made of sheet metal, and wherein said casing is made of plastic.

7. A fastener assembly according to claim 6, wherein said plastic casing through opening is a stepped cylindrical opening with first and second cylindrical sections with different diameters.

8. A fastener assembly according to claim 7, wherein said sheet metal reinforcement part includes a first cylindrical section which is configured to fit into the first cylindrical section and a second section with said conical frustum section which, when inserted into the plastic casing, is stressed to assume a cylindrical shape fitted into the second cylindrical section.

* * * * *